US008639256B2

(12) United States Patent
Garavaglia et al.

(10) Patent No.: US 8,639,256 B2
(45) Date of Patent: Jan. 28, 2014

(54) ADAPTIVE CELL CLUSTERING IN A MULTI-CLUSTER ENVIRONMENT

(75) Inventors: Andrea Garavaglia, Bavaria (DE); Ralf Weber, Kalchreuth (DE); Matthias Schulist, Erlangen (DE); Stefan Brueck, Neunkirchen am Brand (DE)

(73) Assignee: QUALCOMM Incorporated, San Diego, CA (US)

(*) Notice: Subject to any disclaimer, the term of this patent is extended or adjusted under 35 U.S.C. 154(b) by 327 days.

(21) Appl. No.: 13/115,863

(22) Filed: May 25, 2011

(65) Prior Publication Data

US 2012/0135766 A1 May 31, 2012

Related U.S. Application Data

(60) Provisional application No. 61/348,502, filed on May 26, 2010.

(51) Int. Cl.
*H04W 40/00* (2009.01)
(52) U.S. Cl.
USPC ............ 455/447; 455/62; 455/63.3; 455/442; 370/252
(58) Field of Classification Search
USPC ............ 455/447, 62, 63.3, 442, 67.11, 67.13, 455/161.1, 182.1, 436, 439; 370/252, 329
See application file for complete search history.

(56) References Cited

U.S. PATENT DOCUMENTS

| | | | |
|---|---|---|---|
| 5,754,959 A | 5/1998 | Ueno et al. | |
| 5,898,683 A | 4/1999 | Matsumoto et al. | |
| 6,650,900 B1 | 11/2003 | Chavez, Jr. et al. | |
| 6,763,236 B2 | 7/2004 | Siren | |
| 6,850,190 B2* | 2/2005 | Ryu et al. ...................... | 342/377 |
| 7,460,549 B1 | 12/2008 | Cardei et al. | |
| 7,565,151 B2 | 7/2009 | Sano | |
| 7,894,371 B2 | 2/2011 | Bonta et al. | |
| 7,924,734 B2 | 4/2011 | Pujet et al. | |
| 8,068,471 B2* | 11/2011 | Kim et al. ...................... | 370/339 |
| 8,155,661 B2* | 4/2012 | Gerlach ........................ | 455/453 |
| 8,315,225 B2* | 11/2012 | Xu et al. ....................... | 370/330 |

(Continued)

FOREIGN PATENT DOCUMENTS

| | | |
|---|---|---|
| CN | 1870461 A | 11/2006 |
| CN | 1893308 A | 1/2007 |

(Continued)

OTHER PUBLICATIONS

3GPP TR 25.996 v.7.0.0, "Spatial channel model for multiple input multiple output (MIMO) simulations (Release 7)", Jun. 2007, pp. 1-40.

(Continued)

*Primary Examiner* — Minh D Dao
(74) *Attorney, Agent, or Firm* — Steven A. Raney

(57) ABSTRACT

Systems, methods, devices, and computer program products are described for adaptive clustering. Serving cells may receive measurement information from mobile devices, and may each form reporting sets including measurement information for various cells. A CoMP (coordinated multi-point) control unit may receive the measurement information from each of a number of serving cells. The received measurement information may be aggregated for a population of the mobile devices. Based on the aggregated measurement information, cell clusters may be formed to perform coordinated transmissions, each including a different subset of the cells. An indication of the determined cell clusters may be transmitted to respective cells.

51 Claims, 9 Drawing Sheets

(56) References Cited

U.S. PATENT DOCUMENTS

| | | | | |
|---|---|---|---|---|
| 8,320,937 | B2* | 11/2012 | Bolin | 455/456.1 |
| 8,442,143 | B2* | 5/2013 | Lee et al. | 375/267 |
| 8,446,872 | B2* | 5/2013 | Choi et al. | 370/330 |
| 8,457,642 | B2* | 6/2013 | Comeau et al. | 455/442 |
| 2003/0186710 | A1 | 10/2003 | Muhonen et al. | |
| 2004/0067735 | A1 | 4/2004 | Lobley | |
| 2006/0014554 | A1 | 1/2006 | Gerlach | |
| 2006/0072501 | A1 | 4/2006 | Toshimitsu et al. | |
| 2007/0280166 | A1 | 12/2007 | Jung et al. | |
| 2009/0047960 | A1 | 2/2009 | Gunnarsson et al. | |
| 2009/0161688 | A1 | 6/2009 | Park et al. | |
| 2009/0247159 | A1 | 10/2009 | Flore et al. | |
| 2009/0312027 | A1 | 12/2009 | Foschini et al. | |
| 2010/0027456 | A1 | 2/2010 | Onggosanusi et al. | |
| 2010/0041411 | A1 | 2/2010 | Mallik et al. | |
| 2010/0042716 | A1 | 2/2010 | Farajidana et al. | |
| 2011/0028171 | A1 | 2/2011 | Guo et al. | |
| 2011/0085460 | A1* | 4/2011 | Zhang et al. | 370/252 |
| 2011/0159886 | A1* | 6/2011 | Kangas et al. | 455/456.1 |
| 2011/0294527 | A1 | 12/2011 | Brueck et al. | |
| 2011/0312328 | A1* | 12/2011 | Choi et al. | 455/450 |
| 2012/0096234 | A1* | 4/2012 | Jiang et al. | 711/170 |
| 2012/0289275 | A1* | 11/2012 | Li et al. | 455/513 |

FOREIGN PATENT DOCUMENTS

| | | |
|---|---|---|
| EP | 0771127 A2 | 5/1997 |
| EP | 1713206 A1 | 10/2006 |
| EP | 1742382 A2 | 1/2007 |
| EP | 1903816 A1 | 3/2008 |
| JP | 7298340 A | 11/1995 |
| JP | 9102977 A | 4/1997 |
| JP | 2001275145 A | 10/2001 |
| JP | 2006033826 A | 2/2006 |
| KR | 20060050076 A | 5/2006 |
| TW | 200820653 A | 5/2008 |
| WO | WO9853633 A1 | 11/1998 |
| WO | WO0064213 A1 | 10/2000 |
| WO | WO02080458 A1 | 10/2002 |
| WO | WO03069936 A1 | 8/2003 |
| WO | 2007087217 A1 | 8/2007 |
| WO | WO2008011149 A2 | 1/2008 |
| WO | WO2009124083 A1 | 10/2009 |
| WO | WO2009130582 A1 | 10/2009 |

OTHER PUBLICATIONS

3GPP TS 36.300 V8.7.0: Evolved Universal Terrestrial Radio Access (E-UTRA) and Evolved Universal Terrestrial Radio Access Network (E-UTRAN); Overall description; Stage 2, Release 8, Dec. 2008, pp. 1-144.
3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
3GPP TS 36.300 v9.4.0, "Evolved Universal Terrestrial Radio Access (EUTRA) Overall description; Stage 2 (Release 9)", Jun. 2010, pp. 1-171.
3GPP TS 36.331 V8.4.0: 3rd Generation Partnership Project; Technical Specification Group Radio Access Network; Evolved Universal Terrestrial Radio Access (E-UTRA) Radio Resource Control (RRC); Protocol specification (Release 8) (Dec. 2008).
3GPP TSG RAN WG1 #55bis, R1-090237: Setup of CoMP cooperation areas, Nokia Siemens Networks, Nokia, Ljubljana, Slovenia, Jan. 12-16, 2009, pp. 1-4.
3GPP TSG RAN WG1 #55bis, R1-090314: Investigation on Coordinated Multipoint Transmission Schemes in LTE-Advanced Downlink, NTT DOCOMO, Ljubljana, Slovenia, Jan. 12-16, 2009, slides 1-13.
3GPP TSG RAN WG1 #55bis, R1-090335: CoMP Scheme and System Level Performance Evaluation for LTE-A, CMCC , Ljubljana, Slovenia, Jan. 12-Jan. 16, 2009, pp. 1-10.
3GPP TSG RAN WG1 #56, R1-090657: Dynamic Cell Clustering for CoMP, LG Electronics, Athens, Greece, Feb. 9-13, 2009, pp. 1-3.
3GPP TSG RAN WG1 #56, R1-090725: Setup of CoMP cooperation areas, Nokia Siemens Networks, Nokia, Athens, Greece, Feb. 9-13, 2009, pp. 1-4.
3GPP TSG RAN WG1 #56, R1-090745: Cell Clustering in CoMP Transmission/Reception, Nortel, Athens, Greece, Feb. 9-13, 2009, pp. 1-4.
3GPP TSG RAN WG1 #56, R1-090793: Coordinated Multi-Point Transmission—Coordinated Beamforming and Results, Motorola, Athens, Greece, Feb. 9-13, 2009, pp. 1-4.
3GPP TSG RAN WG1 #56, R1-090922: Downlink CoMP-MU-MIMO transmission Schemes, CMCC, Athens, Greece, Feb. 9-13, 2009, pp. 1-8.
3GPP TSG RAN WG1 Meeting #56, R1-090823: Discussion on Timing Advance issue in CoMP & Text Proposal, Huawei, RITT, Texas Instruments, CMCC, Athens, Greece, Feb. 9-13, 2009, pp. 1-9.
3GPP TSG RAN WG1 meeting #57, R1-091687: Discussion on the relation between CoMP cooperating set and CoMP reporting set, NEC Group, May 4-8, 2009, pp. 1-3.
3GPP TSG RAN WG1 meeting #57, R1-091903: Adaptive Cell Clustering for CoMP in LTE-A, Hitachi, May 4-8, 2009, pp. 1-6.
3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).
"3rd Generation Partnership Project; Technical Specification Group Radio Access Network; Evolved Universal Terrestrial Radio Access (E-UTRA); Physical layer; Measurements (Release 9 )", 3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V9.2.0, Jun. 14, 2010, pp. 1-14, XP050441717, [retrieved on Jun. 14, 2010].
CATT: "Aspects of Joint Processing for Downlink CoMP", 3GPP Draft; R1-090942, 3rd Generation Partnership Project (3GPP), Mobile Competence Centre ; 650, Route Des Lucioles ; F-06921 Sophia-Antipolis Cedex ; France, No. Athens, Greece; Feb. 4, 2009, XP050318782.
CATT, "Aspects of Joint Processing in Downlink CoMP", 3GPP Draft, R1-090193, 3rd Generation Partnership Project (3GPP), Mobile Competence Centre , 650, Route Des Lucioles , F-06921 Sophia-Antipolis Cedex , France, No. Ljubljana, Jan. 8, 2009, XP050318126.
Chttl et al., "A Hybrid Concept of ICIC and CoMP for LTE-A: Initial Evaluation", 3GPP Draft; R1-090956, 3rd Generation Partnership Project (3GPP), Mobile Competence Centre; 650, Route Des Lucioles; F-06921 Sophia-Antipolis Cedex; France, No. Athens, Greece; pp. 1-5, Feb. 9-13, XP050318794, [retrieved on Feb. 4, 2009].
Etri, "Coordinated multi-cell transmission for L TE-Advanced Downlink", R1-082896, Aug. 18, 2008, entire document, intervening reference.
Hitachi Ltd: "Consideration on Feedback for Adaptive Cell Clustering", 3GPP Draft; R1-100172 Consideration on Feedback for Adaptive Cell Clustering, 3rd Generation Partnership Project (3GPP), Mobile Competence Centre ; 650, Route Des Lucioles ; F-06921 Sophia-Antipolis Cedex ; France, vol. RAN WGI, No. Valencia, Spain; Jan. 18, 2010, Jan. 22, 2010, XP050418414, [retrieved on Jan. 22, 2010] the whole document.
International Search Report and Written Opinion—PCT/US2011/038215, ISA/EPO—Sep. 7, 2011.
Karakayali M.K., et al., "Network Coordination for spectrally efficient Communications in Cellular Systems", Aug. 2006, IEEE Wireless Communications Magazine pp. 56-61.
LG Electronics: "Cell Clustering and Feedback for CoMP", 3GPP Draft; RI-091189, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, XP050338806, [retrieved on Mar. 17, 2009].
LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), Technical Specification, European Telecommunications Stan-

(56) References Cited

OTHER PUBLICATIONS dards Institute (ETSI), 650, Route Des Lucioles ; F-06921 Sophia-Antipolis ; France, vol. 3GPP RAN 2, No. V9.2.0, Feb. 1, 2010, XP014046900, p. 56-58.

Motorola, "Coordinated Multi-Point Transmission—Coordinated Beamforming/Precoding and Some Performance Results", 3GPP Draft, R1-090325 Comp Results (Motorola), 3rd Generation Partnership Project (3GPP), Mobile Competence Centre , 650, Route Des Lucioles , F-06921 Sophia-Antipolis Cedex , France, No. Ljubljana, Jan. 8, 2009, XP050318236.

Motorola "LTE Advanced Technical Proposals", REV-080011, Apr. 2008, entire document.

Nortel: "Updates on Cell Clustering for CoMP Transmission/Reception", 3GPP Draft; R1-091919(Nortel—Clustering for Comp), 3rd Generation Partnership Project (3GPP), Mobile Competence Centre; 650, Route Des Lucioles; F-06921 Sophia-Antipolis Cedex; France, No. San Francisco, USA; Apr. 28, 2009, XP050339406, [retrieved on Apr. 28, 2009].

NTT DoCoMo, "Proposals for L TE-Advanced Technologies", 3GPP TSG RAN WG1 Meeting 53bis, R1-082575, Jun. 30-Jul. 4, 2008, entire document.

Papadogiannis, A., et al., "A Dynamic Clustering Approach in Wireless Networks with Multi-Cell Cooperative Processing." IEEE Communications, 2008. Piscataway, NJ, USA, May 19, 2008, pp. 4033-4037.

Papadogiannis A., et al., "The Value of Dynamic Clustering of Base Stations for Future Wireless Networks", IEEE International Conference on Fuzzy Systems (FUZZ-IEEE 2010), Barcelona, Spain, Jul. 2010 pp. 1-6.

Sivarama Venkatesan Ed—Anonymous: "Coordinating Base Stations for Greater Uplink Spectral Efficiency in a Cellular Network", IEEE International Symposium on Personal, Indoor and Mobile Radio Communications. PIMRC, IEEE; PI, XX, Sep. 1, 2007, pp. 1-5, XP031168849 ISBN: 978-1-4244-1143-6 p. 1, left-hand column, line 20—right-hand column, line 37 p. 2, right-hand column, line 42—p. 5, left-hand column, line 6.

Texas Instruments "Network MIMO Preceding", 3GPP TSG RAN WG1 #53bis, R1-082497, Jun. 30-Jul. 4 2008, entire document.

T-Mobile Inti., "Candidate Technologies for LTE-Advanced", REV-080047, Apr. 7-8, 2008, entire document.

Ulrich Barth, "Self-X RAN Autonomous Self Organizing Radio Access Networks", 2009 7th International Symposium on Modeling and Optimization in Mobile, Ad Hoc, and Wireless Networks : (WI0PT 2009) ; Seoul, Korea, Jun. 23-27, 2009, IEEE, Piscataway, NJ, USA, [Online] Jun. 23, 2009, pp. 1-36, XP002603562, ISBN: 978-1-4244-4919-4 Retrieved from the Internet: URL:http://www.wiopt.org/pdf/Wi 0pt09_Keyno te_Speech3.pdf> [retrieved on Oct. 5, 2010] pp. 8, 10-11,14-17.

Weber R., et al., "Self-Organizing Adaptive Clustering for Cooperative Multipoint Transmission", Qualcomm CDMA Technologies, submitted to the IEEE Vehicular Technology Conference 2011.

\* cited by examiner

ADAPTIVE CELL CLUSTERING IN A MULTI-CLUSTER ENVIRONMENT

CROSS REFERENCES

The present application for patent claims the priority benefit of U.S. provisional patent application Ser. No. 61/348,502, entitled "ADAPTIVE CELL CLUSTERING IN A MULTI CLUSTER ENVIRONMENT" by Andrea Garavaglia, et al., filed May 26, 2010, assigned to the assignee hereof, and expressly incorporated by reference herein.

BACKGROUND

Certain aspects of the present disclosure relate generally to wireless communications and, more specifically, cell clustering. Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, and Orthogonal Frequency Division Multiple Access (OFDMA) systems.

Coordinated Multipoint (CoMP) transmission is a technique to enhance spectral efficiency and performance in low geometries (e.g., cell edge throughput (for example, but not limited to, LTE Advanced (LTE-A) 3GPP systems). By coordinating downlink transmissions among different cells, the signal to interference-plus-noise ratio (SINR) of users may be improved. There is a challenge to determine which base stations cooperate with each other and form clusters in order to exploit the advantages of CoMP efficiently, while limiting complexity.

Static clusters represent one possible solution. Static clusters are usually kept constant over time and may be formed based on geographical criteria such as the positions of the base stations. However, static clustering does not change in response to actual user traffic conditions and therefore may be regarded as suboptimal.

SUMMARY

The following generally relates to systems, methods, devices, and computer program products for adaptive clustering. Further scope of the applicability will become apparent from the following detailed description, claims, and drawings. The detailed description and specific examples are given by way of illustration only, since various changes and modifications within the spirit and scope of the description will become apparent to those skilled in the art.

In one set of examples, novel functionality is described for adaptive clustering (e.g., from a CoMP control unit). Measurement information may be received from each of a number of cells, the measurement information including raw or preprocessed signal measurements of mobile devices served by the cells. The received measurement information may be aggregated for a population of the mobile devices. Based on the aggregated measurement information, cell clusters may be formed to perform coordinated transmissions, each including a different subset of the cells. An indication of the determined cell clusters may be transmitted to the cells.

In another example, a serving cell may receive measurement information including sets of cells observed by mobile devices associated with the serving cell. A reporting set may be formed for each cell in the sets of cells having a signal strength that exceeds a predetermined threshold value. The reporting sets may be transmitted to a CoMP control unit. An indication of a cell cluster may be received by the serving cell, where the cluster is determined by the CoMP control unit based on the reporting sets for a number of cells, including the serving cell.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, devices, and computer program products are described for adaptive clustering. Serving cells may receive measurement information from mobile devices, and may each form reporting sets including measurement information for various cells. A CoMP control unit may receive the measurement information from each of a number of serving cells. The received measurement information may be aggregated for a population of the mobile devices. Based on the aggregated measurement information, cell clusters may be formed to perform coordinated transmissions, each including a different subset of the cells. An indication of the determined cell clusters may be transmitted to respective cells.

More specifically for an LTE-A system, user equipment (UE) measurements may be collected at each cell of the group of cells to be included. Measurements may be the signal strength measurements reported by various UEs during normal operation (e.g., measurement report messages—MRMs—configured for mobility management or other functions). This may capture the changing environment perceived by the users and the traffic situation. An enhanced Node B (eNB) may, therefore, capture and sort the radio channel conditions in terms of cell combinations. The sorted measurement information may be propagated to a CoMP control unit, which may adjust the various clusters in the controlled region in a multiple adaptive approach while optimizing a performance target. The target function may account for quality and operator policy, radio conditions, system performance, and system complexity.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the systems may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
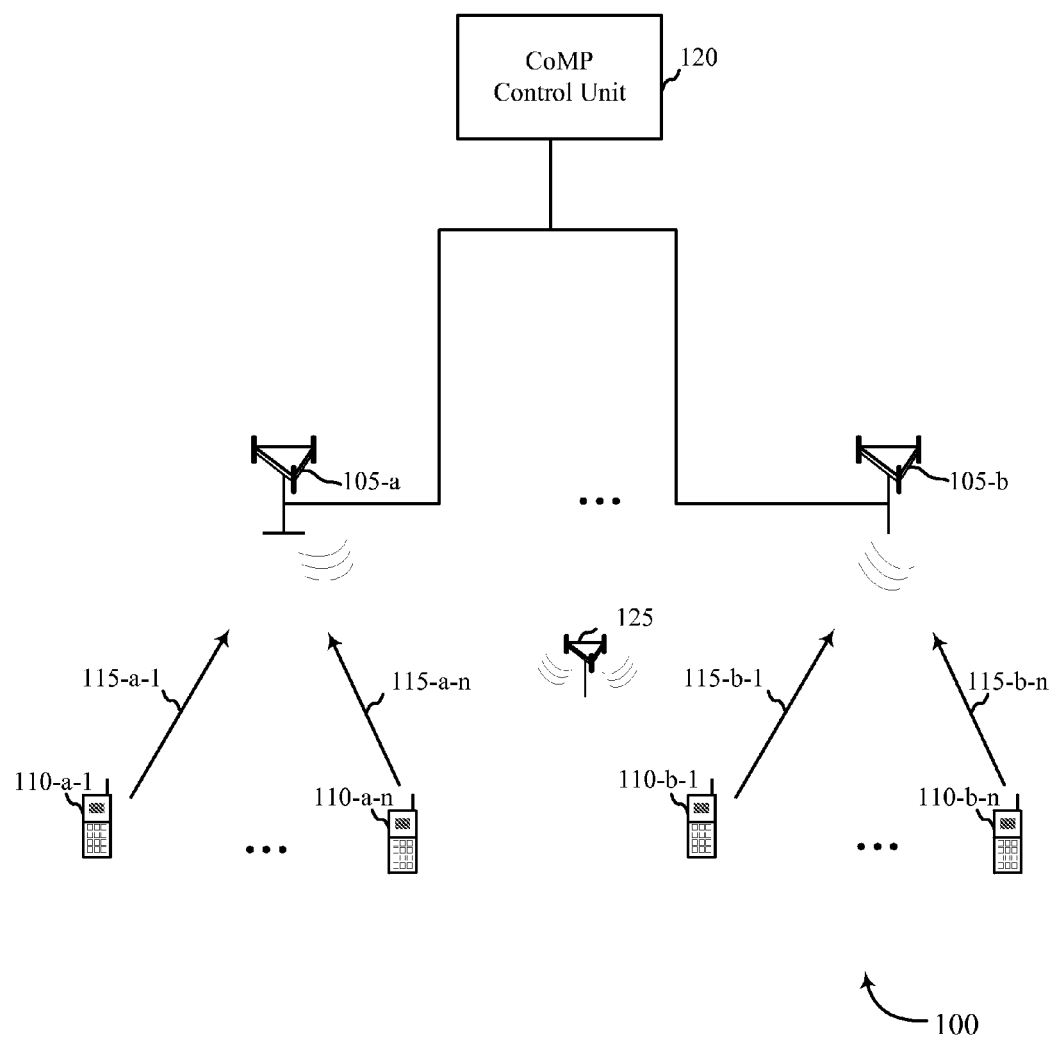
FIG. 1 is a block diagram of a wireless communication system.

Turning first to FIG. 1, a multiple access wireless communication system 100 is illustrated. The system includes mobile devices 110, each served by a base station 105. A base station 105a, 105b may wirelessly receive data 115 including measurement information from the mobile devices 110 served by its cells. The measurement information 115 may also include measurements taken by mobile devices 110 of the non-serving cells (e.g., from other base stations 125). The base station 105a, 105b may form a reporting set for each cell having sufficient signal strength.

Base stations 105 may transmit the reporting sets to a CoMP control unit 120. CoMP control unit ("control unit") 120 may receive the measurement information from each of a number of serving cells. The received measurement information may be aggregated for a population of the mobile devices. Based on the aggregated measurement information, cell clusters may be formed to perform coordinated transmissions, each formed cell cluster including a different subset of the cells. The CoMP control unit 120 may transmit an indication of the determined cell clusters to respective base stations 105. Although shown as a separate entity, it should be noted that CoMP control unit 120 is related to the CoMP functionality and clustering and may be a logical function located in one or more other nodes, and/or may be part of a Self-Organizing Network (SON) server, or an Operations and Maintenance (O&M) system.

Thus, cells may be grouped into clusters. Each cluster may have a master cell, which centrally manages resources of that cluster. A mobile device 110 may transmit channel quality information (CQI), precoder matrix indication (PMI), and rank indicator (RI) information to a base station 105. If the serving cell is not the cluster master cell, the reports may be forwarded over a backhaul (e.g., X2) to the master cell. The master cell may distribute scheduling information to the base stations 105 (e.g., over X2), and different processing schemes are possible.

Turning briefly to a more general description of the system, a base station 105 may include multiple antenna groups (not shown), and there may be multiple antennas in each antenna group. Each group of antennas and/or the area in which they are designed to communicate may be referred to as a cell. Antenna groups each may be designed to communicate with mobile devices 110 in a particular area covered by the base station 105. The base station 105 may be an enhanced Node B (eNB) in an LTE system, although aspects may be applicable to any number of other types of systems.

A set of mobile devices 110 may be in communication with one of the antenna groups of base station 105, and this may be referred to as the serving cell. The base station 105 may transmit information over a downlink and receive information from a mobile device 110 over an uplink. Each of the downlink and uplink may include a number of component carriers which have been configured for use by the mobile device 110. The mobile device 110 may be user equipment (UE) in an LTE system. The mobile device 110 may be a personal computer, laptop, tablet, personal digital assistant (PDA), thin client, smartphone, cellular telephone, or any other mobile computing device.

A mobile device 110 may measure signal strength and other channel quality metrics from both serving and non-serving cells. The measurement may, for example, include a reference signal receive power (RSRP) or reference signal receive quality (RSRQ) measurement. A mobile device 110 may transmit all or a portion of the measurements in a measurement report message (MRM) to a serving cell. The periodicity in which a measurement is taken and the type of information to be collected at a mobile device 110 may be dictated by the mobile device 110, the base station 105, the control unit 120, or any combination thereof. The measurement interval may be static, or be responsive to traffic or clustering parameters at the serving or non-serving cells. A control unit 120 or base station 105 may control the reporting interval at the mobile device 110. The reporting interval may be a multiple of a scheduling interval for downlink transmissions with which measurement information is collected (for example, if the measurement interval is every x ms, the reporting interval may be 10x ms).

A base station 105 may receive measurement information made up of measurements of a set of cells observed by mobile devices 110 associated with the serving cell. Each base station 105 (or serving cell) may form a reporting set of measurements for each cell in the sets of cells having a signal strength that exceeds a predetermined threshold value. Thus, measurements in which a mobile device 110 reported signal strength below a threshold may be discarded. The base station 105 may determine neighbor relations information corresponding to cells identified in the measurement information. A base station 105 (or serving cell) may transmit the reporting sets at a predetermined reporting interval. Alternatively, the reporting sets may be reported when it is determined that signal strength of at least one cell changes in excess of a threshold. The reporting interval may be set or modified by the base station 105 or control unit 120. The reporting interval for the base station 105 may be a multiple of a scheduling interval for downlink transmissions with which measurement information is collected by, or received from, a mobile device 110 (for example, if the measurement interval at a mobile device is every x ms, the reporting interval to the control unit 120 may be 100x ms). Thus, a base station 105 may compile and analyze measurement information over a longer period of time before forwarding it to a control unit 120. In some examples, the base station 105 may perform averaging calculations for various measurements, and send the averaged information as measurement reports to the control unit 120.

In some aspects, a base station 105 may combine the measurement information to create a neighbor relations table listing cells, their neighbor relations, and the received measurements from different mobile devices. The information may be computed in a distributed fashion by each base station 105 of a group, based on elaboration of existing measurement information and applying an extension of the neighbor relations table, and then sent to the control unit 120. As noted, in one example, a base station 105 is an enhanced Node B (eNB), and the eNB sorts the measurement information for the UEs being served by the eNB. The eNB may perform a statistical evaluation of MRMs (e.g. RSRP values). Each eNB may send the measurement information, and may also compile and send and indication of longer term channel conditions for the UEs it serves.

The control unit 120 may receive measurement information from each of a number of base stations 105. The control unit 120 may be made up of one or more server computers, workstations, web servers, or other suitable computing devices. The control unit 120 may be integrated with a base station 105, a core network, or a combination thereof. The control unit 120 may be fully located within a single facility or distributed geographically, in which case a network may be used to integrate different components. Although the illustrated embodiment shows that a control unit 120 performs the adaptive clustering, in other examples these functions may be performed by other devices or sets of devices.

The CoMP control unit 120 may control the clustering for a pre-defined number of base stations 105 (e.g., for around 20-30 eNBs). The control unit 120 may compute and update clusters for the group, making use of information from base stations 105 on a periodic basis. The control unit 120 may receive and aggregate measurement information for a population of the mobile devices, and then determine, based on the aggregated measurement information, cell clusters to perform coordinated transmissions.

The cluster determination may be performed periodically by the CoMP control unit 120. In one example, this determination may involve changing a first set of cell clusters to a second, different set of cell clusters for a group of base stations 105 in response to the aggregated measurement information. While this updating may be periodic, it may involve adapting the cell clusters only when one or more performance indicators change in excess of a threshold. The clustering may be performed to optimize one or more performance indicators. In some examples, performance indicators may include system complexity, delay, combined signal strength, system load, user priority classifications, or other network related metrics to optimize cluster groups. For example, backhaul delay may be calculated for a candidate cluster, and the candidate cluster may be rejected when its the backhaul delay exceeds a predetermined threshold. There may be a variety of optimization functions used, and systems may weight certain factors differently. The CoMP control unit 120 may iteratively evaluate different combinations of cell clusters. Examples of such optimization functions will be discussed in more detail below.

The CoMP control unit 120 may identify a cell cluster based on the rate of recurrence that a cell combination is detected by the mobile devices (e.g., the more mobile devices that detect a combination, the more likely that cell combination is to be included in a cluster). In one example, an eNB may pre-process measurement information and build a table such that combinations of cells which are detected often by several UEs are ranked higher than or otherwise favored over other combinations.

There may be predetermined, or dynamic, criteria used in the formation of clusters. In some examples, each cell may belong to only one cluster at a time, while in others, cells may belong to a number of clusters concurrently. In some examples, the coverage of the cells of each cluster are required to be geographically adjacent to each other. Accordingly, the control unit 120 may determine a set of neighbor relations corresponding to the various cells, and only form clusters where the cells of the cluster have adjacent coverage areas. The control unit 120 may transmit an indication of the determined cell clusters to base stations 105.

In one set of examples, aspects may be used within a Long Term Evolution-Advanced (LTE/A) system. LTE/A may utilize orthogonal frequency division multiplexing (OFDM) on the downlink and single-carrier frequency division multiplexing (SC-FDMA) on the uplink. OFDM and SC-FDMA partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDMA. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively. While an LTE/A system is used for purposes of example, aspects of the invention may be used in a variety systems (e.g., Universal Mobile Telecommunication System (UMTS)).

Figure 2:
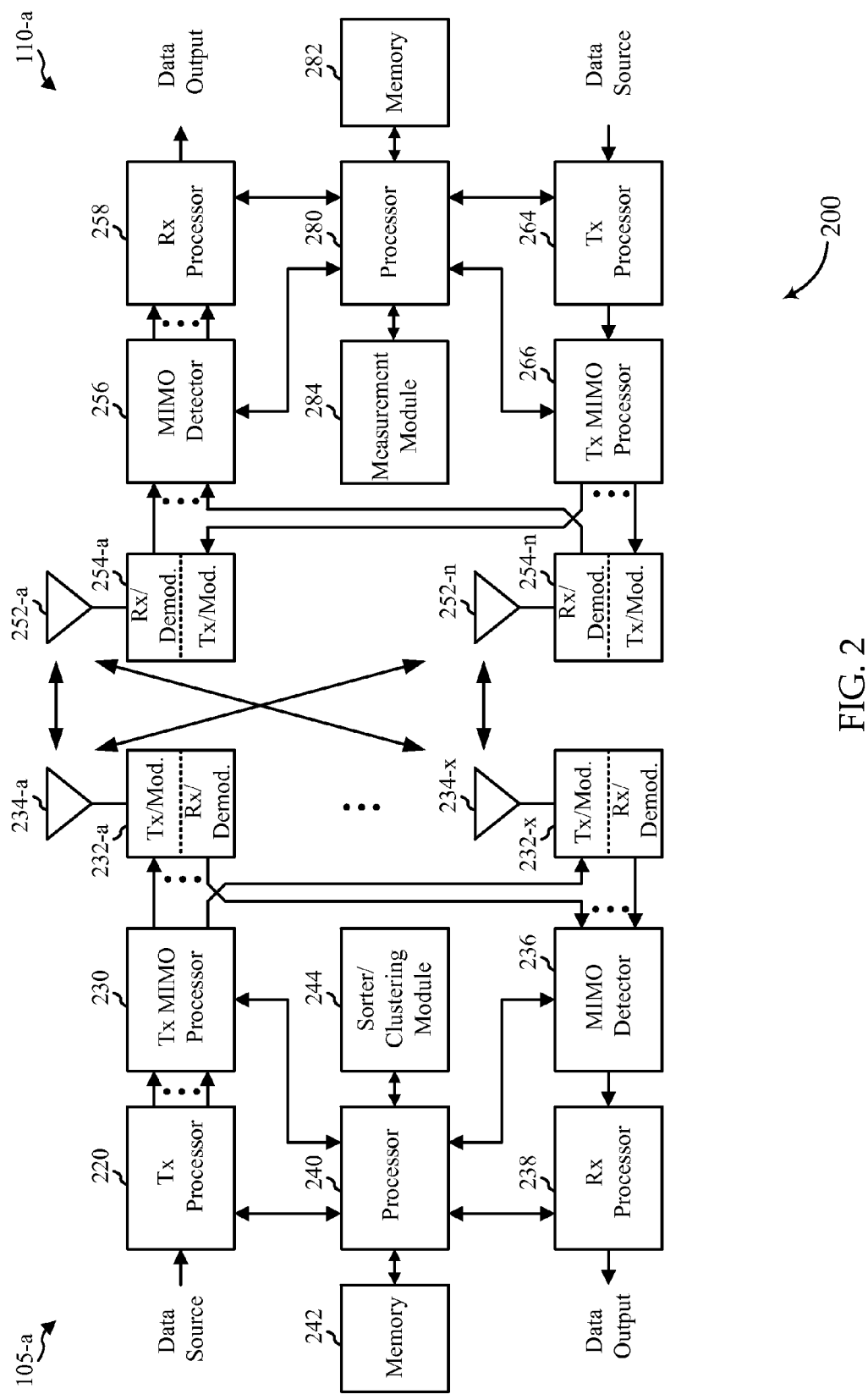
FIG. 2 is a block diagram of a transmitter and receiver in a multiple input multiple output (MIMO) system.

FIG. 2 is a block diagram of a system 200 including an eNB 105-a and a UE 110-a. This system 200 may be the system 100 of FIG. 1. The eNB 105-a may be equipped with antennas 234-a through 234-x, and the UE 110-a may be equipped with antennas 252-a through 252-n. At the eNB 105-a, a transmit processor 220 may receive data from a data source and control information from a processor 240, memory 242, and sorter/clustering module 244. The control information may indicate the type of information to be collected. The control information may also include a scheduling interval at which a UE 110-a shall collect and/or report measurement information (e.g., MRMs). The type of information to be collected and the scheduling interval may be set by the eNB 105-a (e.g., by the sorter/clustering module 244), or by a CoMP control unit (e.g., the control unit 120 of FIG. 1).

The transmit processor 220 may process (e.g., encode and symbol map) the data and control information to obtain data symbols and control symbols, respectively. The transmit processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transmit modulators 232-a through 232-x. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232-a through 232-x may be transmitted via the antennas 234-a through 234-x, respectively.

At the UE 110-a, the UE antennas 252-a through 252-n may receive the downlink signals from the eNB 105-a and may provide the received signals to the demodulators 254-a through 254-n, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive processor 258 may process (e.g., demodulate, deinterleave, and decode) the detected symbols, providing decoded data for the UE 110-*a* to a data output, and provide decoded control information to a processor 280, memory 282, or measurement module 284. The measurement module 284 may receive the information identifying the type of information to be collected, and the reporting interval. The measurement module 284 may measure signal strength and other channel quality metrics from both serving and non-serving cells. The measurement may, for example, include a reference signal receive power (RSRP) or reference signal receive quality (RSRQ) measurement. A UE 110-*a* may transmit all or a portion of the measurements in a MRM to the eNB 105-*a* via the uplink.

On the uplink, at the UE 110-*a*, a transmit processor 264 may receive and process data from a data source and control information (e.g., MRMs) from the processor 280 and measurement module 284. The transmit processor 264 may also generate reference symbols for a reference signal. The symbols from the transmit processor 264 may be precoded by a transmit MIMO processor 266 if applicable, further processed by the demodulators 254-*a* through 254-*n* (e.g., for SC-FDMA, etc.), and be transmitted to the eNB 105-*a*. At the eNB 105-*a*, the uplink signals from the UE 110-*a* may be received by the antennas 234, processed by the demodulators 232, detected by a MIMO detector 236 if applicable, and further processed by a receive processor 238 to obtain decoded data and control information sent by the UE 110-*a*. The receive processor 238 may provide the decoded data to a data output and the decoded control information to the processor 240 and sorter/clustering module 244.

The sorter/clustering module 244 may receive measurement information made up of measurements of a set of cells observed by UE 110-*a* and other UEs associated with the eNB 105-*a*. The sorter/clustering module 244 may form a reporting set for each cell in the sets of cells having a signal strength that exceeds a predetermined threshold value. The sorter/clustering module 244 may determine neighbor relations information corresponding to cells identified in the measurement information. The sorter/clustering module 244 may transmit the reporting sets to a CoMP control unit (e.g., control unit 120 of FIG. 1) at various intervals. The sorter/clustering module 244 may receive an indication of a cell cluster determined by the control unit based on the reporting sets for a number of cells, including the serving cell.

Figure 3:
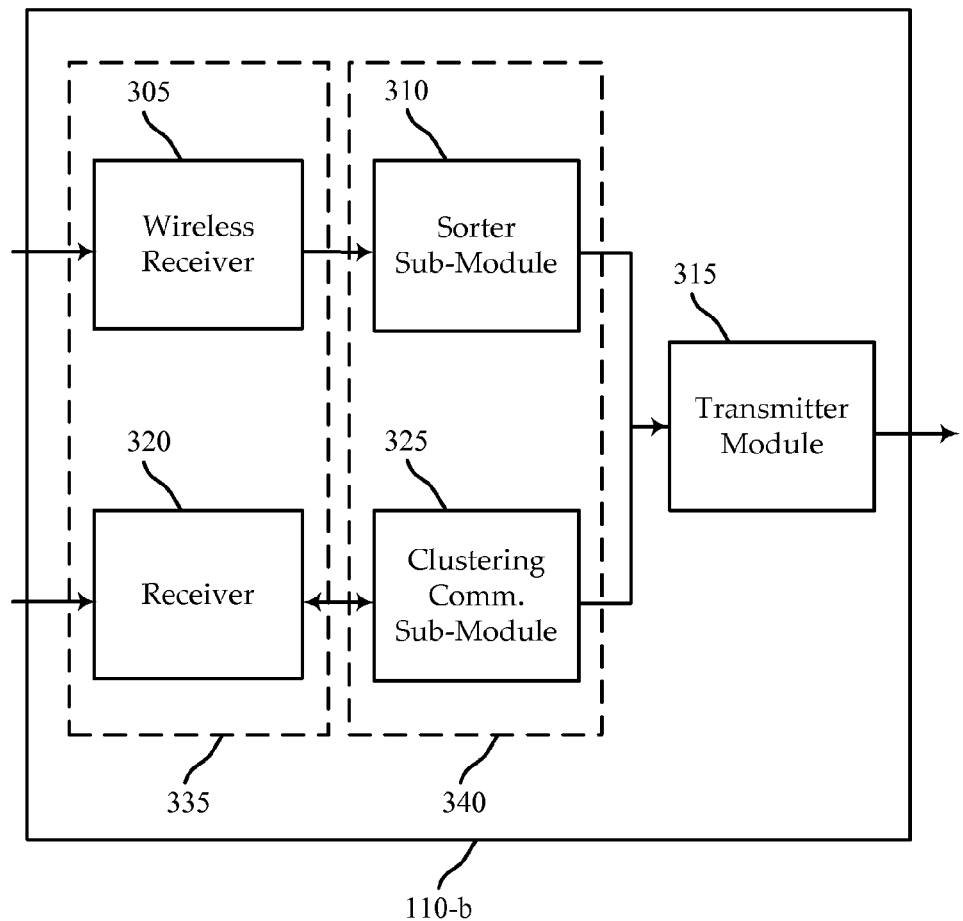
FIG. 3 is a block diagram of a base station.

Turning next to FIG. 3, a simplified block diagram 300 shows an example of a base station 110-*b*. The base station 110-*b* may be the base station 110 of FIG. 1 or 2. The base station 110-*b* includes a receiver module 335, and sorter/clustering module 340, and a transmitter module 315. The sorter/clustering module 340 may be the sorter/clustering module 244 of FIG. 2.

The sorter/clustering module 340 may be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

A wireless receiver 305 in the receiver module 335 may receive from mobile devices (e.g., mobile devices of FIG. 1 or 2) measurement information made up of measurements of a set of cells observed by each mobile device. A sorter sub-module 310 may receive the measurement information (e.g., MRMs), and extract RF measurements (e.g. RSRP values) and sets of cells observed from the mobile devices, and create and update neighbor relationship tables. The sorter sub-module 310 may compile this information, performing a statistical evaluation of the measurement information, and in some examples analyzing and tracking longer term channel conditions for the mobile devices served by the base station 105-*b*. The sorter sub-module 310 may form a reporting set for each cell in the observed sets of cells having an observed signal strength that exceeds a predetermined threshold value. Thus, measurements in which a mobile device reported low signal strength may be discarded. The sorter sub-module 310 may identify a combination of cells detected by subset of the mobile devices (e.g, when a certain combination is detected with more regularity than other combinations).

A transmitter module 315 may transmit the reporting sets to a CoMP control unit (e.g., control unit 120 of FIG. 1). The reporting sets may be transmitted at a predetermined reporting interval, or when it is determined that signal strength of at least one cell changes in excess of a threshold. The reporting interval may, for example, be set or modified by the sorter sub-module 310 or a CoMP control unit. The transmitter module 315 may transmit the identified combination of cells to a control unit 120. The receiver module 305 may receive an indication of a cell cluster determined by the control unit based on the combination of cells.

Figure 4A:
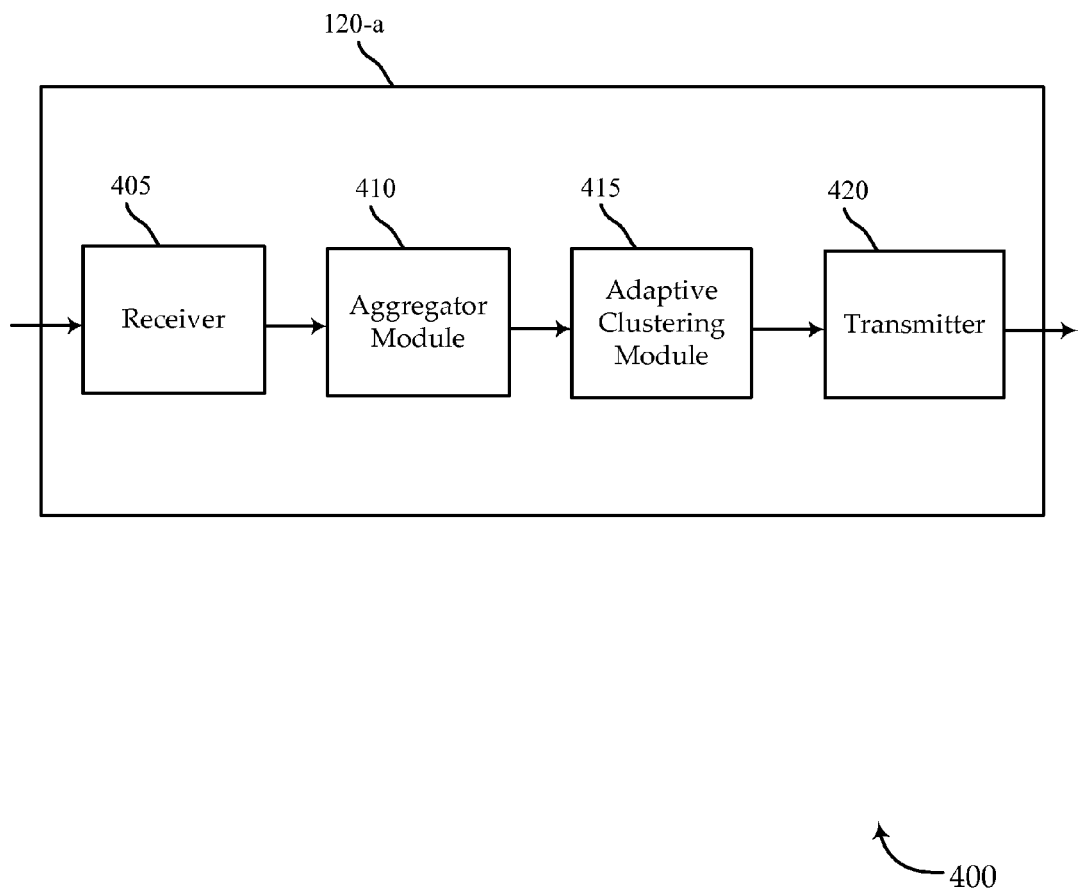
FIG. 4A is a block diagram of a control unit.

Turning next to FIG. 4A, a simplified block diagram 400 shows an example of a CoMP control unit 120-*a*. It is again worth noting that the CoMP control unit 120-*a*, or any functionality related thereto, may be integrated into another node of the network. The CoMP control unit 120-*a* may be the control unit of FIG. 1. The CoMP control unit 120-*a* includes a receiver 405, aggregator module 410, adaptive clustering module 415, and transmitter 420.

The components of the CoMP control unit 120-*a* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The CoMP control unit 120-*a* may control the clustering for a pre-defined number of base stations (e.g., for around 20-30 eNBs). The receiver 405 may receive measurement information from each of a number of base stations (e.g., the base station 105 of FIG. 1, 2, or 3). This measurement information may be the signal measurement information collected by a serving cell from the mobile devices it serves, as described above. For example, the measurement information may be a reporting set for each cell in an observed set of cells having a signal strength that exceeds a predetermined threshold value. The measurement information may be collected by the CoMP control unit 120-*a* from each of the serving cells that are in the pool of cells (which may hereinafter referred to as the "top cluster") to be formed into clusters by the CoMP control unit 120-*a*. In one example, the radio channel conditions are captured in terms of cell combinations and sorted internally at each eNB, then forwarded as measurement information to the CoMP control unit 120-*a*. The aggregator module 410 may aggregate the received measurement information for a population of the mobile devices. The adaptive clustering module 415 may determine cell clusters to perform coordinated transmissions. The transmitter 420 may transmit an indication of the determined cell clusters to respective base stations.

The adaptive clustering module 415 may compute and update clusters for the group, making use of aggregated information. The cluster determination may be performed periodically by the CoMP control unit 120. In one example, this determination may involve changing a first set of cell clusters to a second, different set of cell clusters for set of base stations in response to the aggregated measurement information. While this updating may be periodic, it may involve adapting the cell clusters only when one or more performance parameters change in excess of a threshold. The clustering may be performed to optimize one or more performance parameters. In some examples, performance parameters may include system complexity, delay, combined signal strength, system load, user priority classifications, or other network related metrics to optimize cluster groups. For example, backhaul delay may be calculated for a candidate cluster, and the candidate cluster may be rejected when the backhaul delay exceeds a predetermined threshold. There may be a variety of optimization functions used, and systems may weight certain factors differently. The adaptive clustering module 415 may iteratively evaluate different combinations of cell clusters.

There may be predetermined, or dynamic, criteria used in the formation of clusters. In some examples, each cell may belong to only one cluster at a time, while in others, cells may belong to a number of clusters concurrently. In some examples, the coverage of the cells of each cluster are required to be geographically adjacent to each other. Accordingly, the adaptive clustering module 415 may determine a set of neighbor relations corresponding to the various cells, and only form clusters where the cells of the cluster have adjacent coverage areas.

Although a number of clustering algorithms are contemplated, the following represents a more specific set of examples. Within each serving cell, statistics on reported measured values (e.g. RSRP) may be collected, processed, and sent by eNBs to a CoMP control unit 120-*a* as measurement information. Signaling information may be tracked at eNBs, allowing the eNBs decide if the new information has enough changes to be worth being sent to CoMP control unit 120-*a* (e.g., using a configurable threshold or similar approach). The adaptive clustering module 415 may be generally configured to solve an optimization problem that, given the information provided by eNBs about measured radio channel and cell combinations, sorts out the new optimized clustering within the top cluster. The adaptive clustering module 415 also identifies when there is a need to update the cluster (e.g. significant change of the situation, performance degradation, etc.).

An exemplary optimization scheme that may be used by the adaptive clustering module 415 may be described with the help of the following definitions. G(V,F) may represent a graph described by vertices V and edges F associated to a top cluster. The vertices are mapped into cells (e.g., v∈V=cells in the top cluster), and the edges are mapped into established interconnections (e.g., f∈F=established X2 relations). These may be identified according to neighbor relations tables present in the top clusters. To each edge f∈F, a delay $d_f$ may be associated that accounts for the difference in time the coordinated transmission of the two cells of edge f reaches the UE.

Let γ be a set of cells in the top cluster among all possible sets in G: $\gamma \in \Gamma_G$. To each set $\gamma_j$ there is an associate cost $c_j$, a delay $d_j$=worst case delay within the set, and a cardinality $k_j$=number of cells in the set.

A set $\gamma_j$ may be admitted to the final solution when the following conditions are satisfied:

$$K_{min} \leq k_j \leq K_{max} \text{ (1), and} \qquad \text{Eq. 1}$$

$$d_j \leq D_{max} \text{ (2)} \qquad \text{Eq. 2}$$

Representing with $R_G \subseteq \Gamma_G$ all admitted sets for the top cluster G, the characteristic matrix A may be introduced whose elements $a_{kj} \in \{0,1\}$ and the decision variable $x_j$ are defined as below:

$$a_{kj} = \begin{cases} 1 & \text{if cell } k \in \gamma_j \\ 0 & \text{otherwise} \end{cases} \qquad \text{Eq. 3}$$

$$x_j = \begin{cases} 1 & \text{if } \gamma_j \text{ belongs to final solution} \\ 0 & \text{otherwise} \end{cases} \qquad \text{Eq. 4}$$

Eq. 3 identifies how sets are composed while Eq. 4 identifies which sets belong to the final solution. The optimization problem may be then described as:

$$\min \sum_{\gamma_j \in R_G} c_j x_j \text{ such that} \qquad \text{Eq. 5}$$

$$\sum_{\gamma_j \in R_G} a_{kj} x_j \geq 1 \quad \forall v_k \in V \qquad \text{Eq. 6}$$

$$x_j \in \{0, 1\} \quad \forall \gamma_j \in R_G \qquad \text{Eq. 7}$$

Eq. 5 captures the optimization objective of minimizing the overall costs, under the constraints of having each cell in the top cluster belonging to at least one cluster (Eq. 6) and imposing the solution to be integer (Eq. 7). Constraints may also be further refined for example imposing equality in Eq. 6 for disjoint clusters, or $K_{min}=K_{max}$.

Also, other constraints may be considered, such as: 1) considering a subset $F' \subseteq F$ that only includes relations between cells that are geographically adjacent to each other, or 2) reducing the solution space by restricting $R_G \subseteq \Gamma_G$ to only sets that have been observed at least once (or a given number $N_{min}$ of times) by UEs in the top cluster.

Looking at the system performance and complexity, the following factors contributing to the cost function may be identified. In one example, the cost of a set is:
1. higher for larger number of cells, or cardinality $k_j$ (system complexity);
2. higher for larger set delay $d_j$ (performance loss);
3. lower for better combined RF; and
4. lower for larger number of measured cases $N_j$ (a lot of UEs benefiting from it).

The cost function may therefore be written, for example, as:

$$c_j \propto \frac{d_j \cdot k_j}{RSRP_j \cdot N_j} \text{ where} \qquad \text{Eq. 8}$$

$$RSRP_j = \sum_{v_k \in V} a_{kj} RSRP_k \qquad \text{Eq. 9}$$

wherein $RSRP_j$ is a combined signal over the set, a rough estimate of RF potential. Note that in other examples, other cost factors can be used, including system load, user priority classifications, or other network related metrics.

The optimization described above may be approached with a heuristic technique, with some randomized components. The technique may include the following:

1. Generate all admitted sets in an exhaustive way. This is possible as the computational complexity, which grows exponentially with the number of cells and neighbor relations, remains manageable considering an exemplary top cluster that includes around 30-40 cells, and $K_{max}$ and $D_{max}$ have practical limits.
2. Associate to each set $\gamma_j$ its cost $c_j$, for example, according to Eq. 8.
3. Create an initial solution by adding the sets in increasing cost order, until all cells are included in the final solution or there are no more candidate sets. This may need to be modified in case of disjoint sets, as at each step the sets overlapping with the ones in the solution shall be removed from the candidate list. The process stops when all cells are covered, or the candidate list is empty.
4. Improve the solution, by step-wise replacing two (or more) sets with one not included, whose cost is lower than the sum of the costs of the replaced sets. This is the only way to decrease the cost, as the initial solution was built by selecting sets in cost-decreasing order.

According to certain aspects, the adaptive clustering unit 415 carries out the above four steps to determine cell clusters based on the sorted measurement information. The transmitter 420 provides an indication of the determined cell clusters to the eNBs. For example, adapted cluster sets of few cells may be determined by the adaptive clustering unit 415, and signaled back to the cells of the top cluster via the transmitter 420, so that appropriate coordination can take place.

Figure 4B:
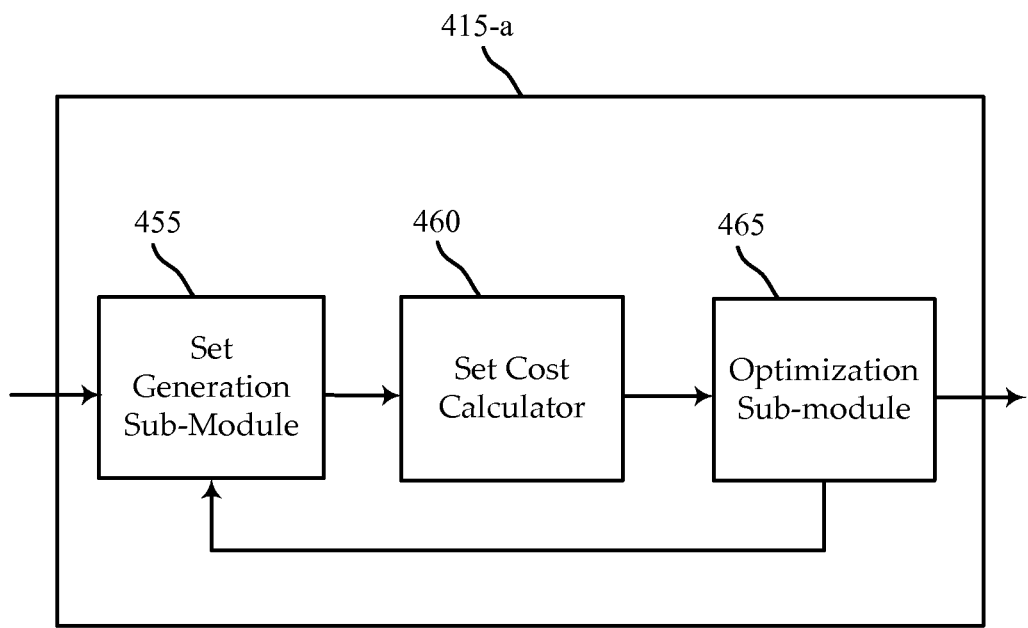
FIG. 4B is a block diagram of an adaptive cluster module.

FIG. 4B is a simplified block diagram 450 showing an example of an adaptive clustering unit 415-a. The adaptive clustering unit 415-a may be the adaptive clustering unit 415 of FIG. 4A. The adaptive clustering unit 415-a includes a set generation sub-module 455, a set cost calculator 460, and an optimization sub-module 465.

The adaptive clustering unit 415-a may receive aggregated measurement information. The adaptive clustering unit 415-a may run the following updates periodically, or based on changes in certain performance parameters. The set generation sub-module 455 may generate a number of different sets of clusters to be considered. In one example, all admitted sets may be generated in an exhaustive way, although other set determination schemes may be used, as well. The cost calculator 460 may calculate the cost using any combination of the cost metrics set forth above (e.g., according to Eq. 8). The optimization sub-module 465 may create an initial solution by adding the sets in increasing cost order, until all cells are included in the final solution or there are no more candidate sets (this may be modified in case of disjoint sets, as at each step the sets overlapping with the ones in the solution are removed from the candidate list). The optimization process may be suspended when all cells are covered, or the candidate list is empty. The set generation sub-module 455 may generate a number of different sets of clusters to be considered by replacing two (or more) sets with one not included. The cost calculator 460 may calculate the cost of each replacement set. The optimization sub-module 465 may create new sets with lower costs. This process may continue until the lowest cost solution is reached. It is worth noting that this is but one of a number of optimization schemes that may be used for various examples described herein.

Figure 5:
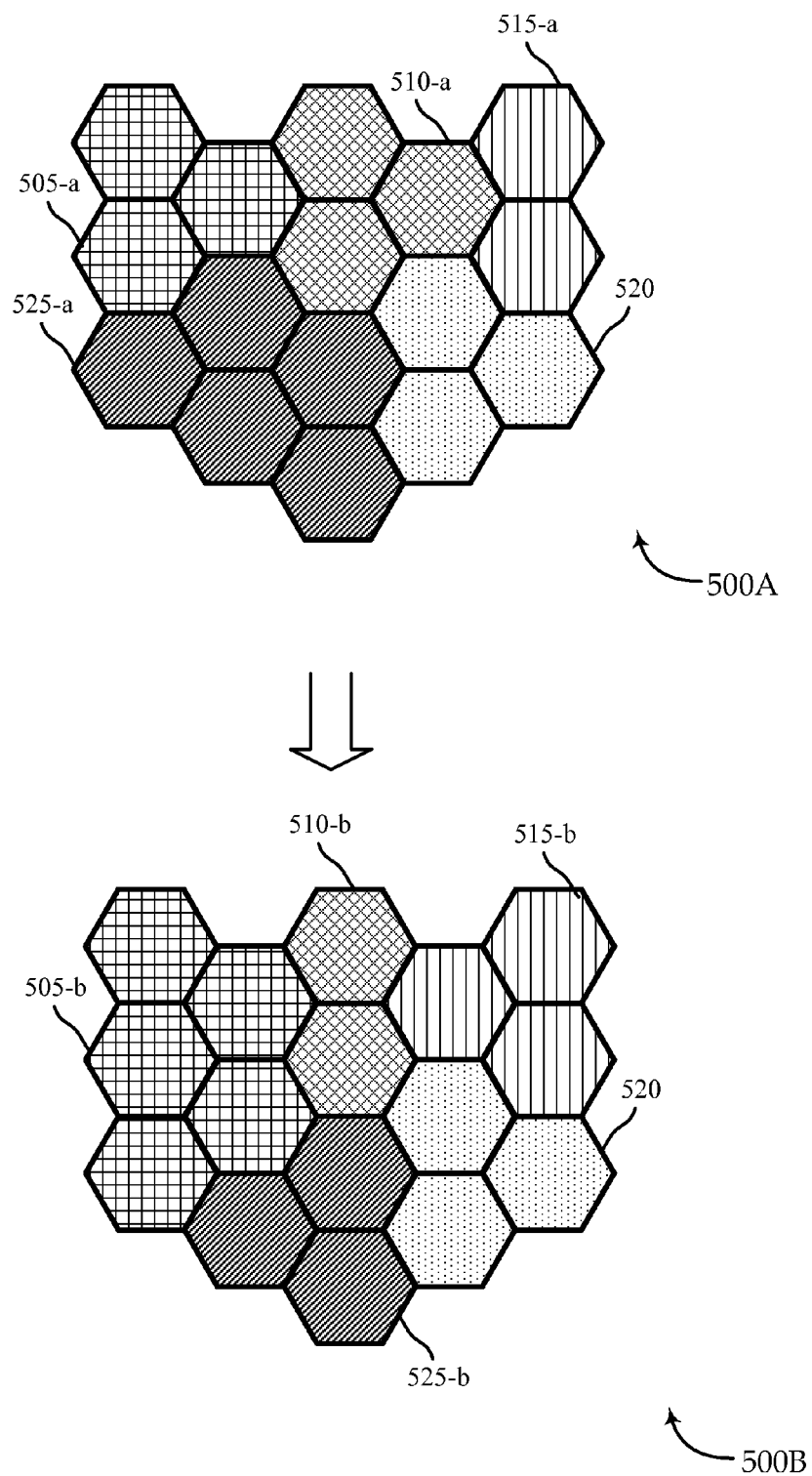
FIG. 5 is a diagram illustrating adaptive clustering in a multi-cluster environment.

FIG. 5 is a diagram illustrating adaptive clustering. A first cell clustering layout 500A is illustrated at a first time ($t_1$), in which there are five different cell clusters (505-a (three cells), 510-a (three cells), 515-a (two cells), 520 (three cells), and 525-a (five cells). At or about time ($t_1$), an adaptive clustering algorithm as described above is performed using aggregated measurement information at a CoMP control unit (e.g., the control unit 120 of FIG. 1 or 4A).

A first cell clustering layout 500A may change in response to the adaptive clustering algorithm, the changes shown in the second clustering layout 500B illustrated at a second time ($t_2$). There are still five different cell clusters (505-b (five cells, two new added), 510-b (two cells, one removed), 515-b (three cells, one new added), 520 (three cells, unchanged), and 525-b (three cells, two removed). This illustrates how cell clusters may evolve over time in response to an adaptive clustering scheme described herein.

Figure 6:
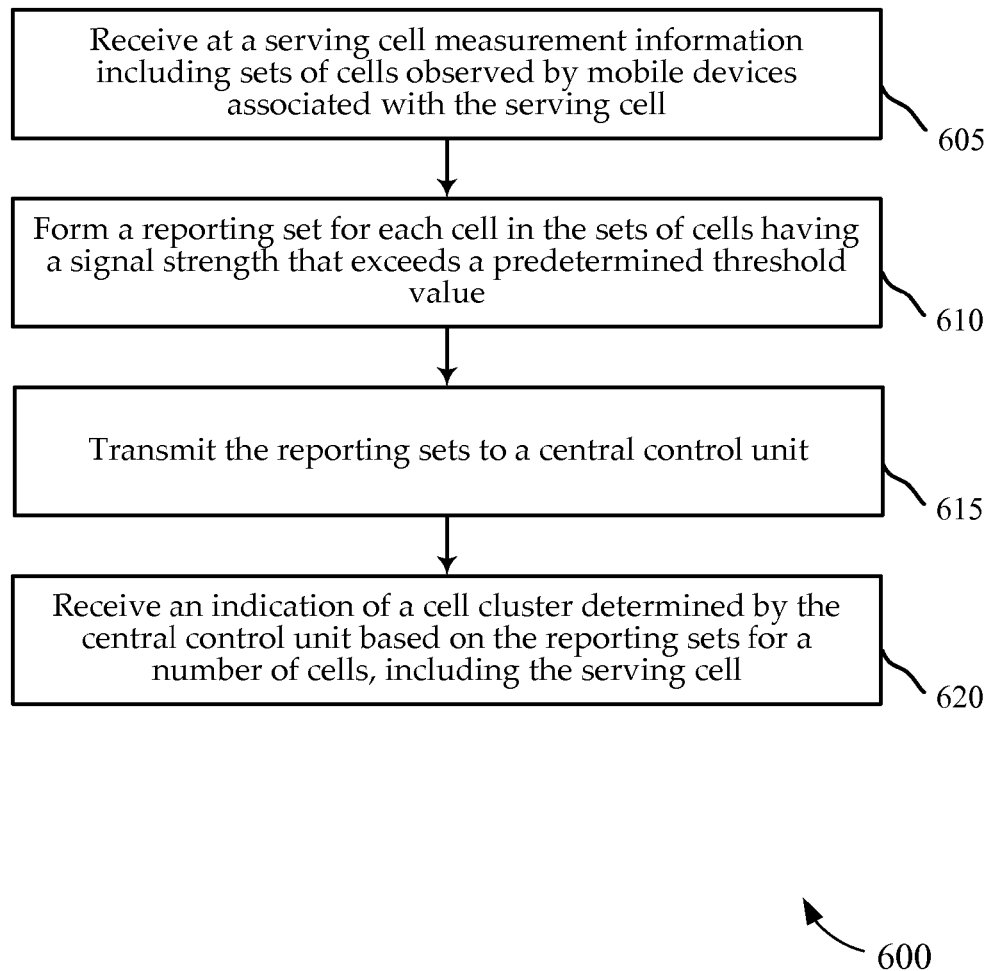
FIG. 6 is a flowchart of a system for facilitating adaptive clustering.

FIG. 6 is a flow chart of a system 600 to facilitate adaptive clustering. The system may be performed, in whole or in part, by the base station 105 of FIG. 1, 2, or 3 or, more specifically by the sorter/clustering module 244, 335 of FIG. 2 or 3.

At block 605, measurement information is received at a serving cell, including sets of cells observed by mobile devices associated with the serving cell. At block 610, a reporting set is formed for each cell in the sets of cells having a signal strength that exceeds a predetermined threshold value. At block 615, the reporting sets are transmitted to a control unit. At block 620, an indication of a cell cluster determined by the control unit is received based on the reporting sets for a number of cells, including the serving cell.

Figure 7:
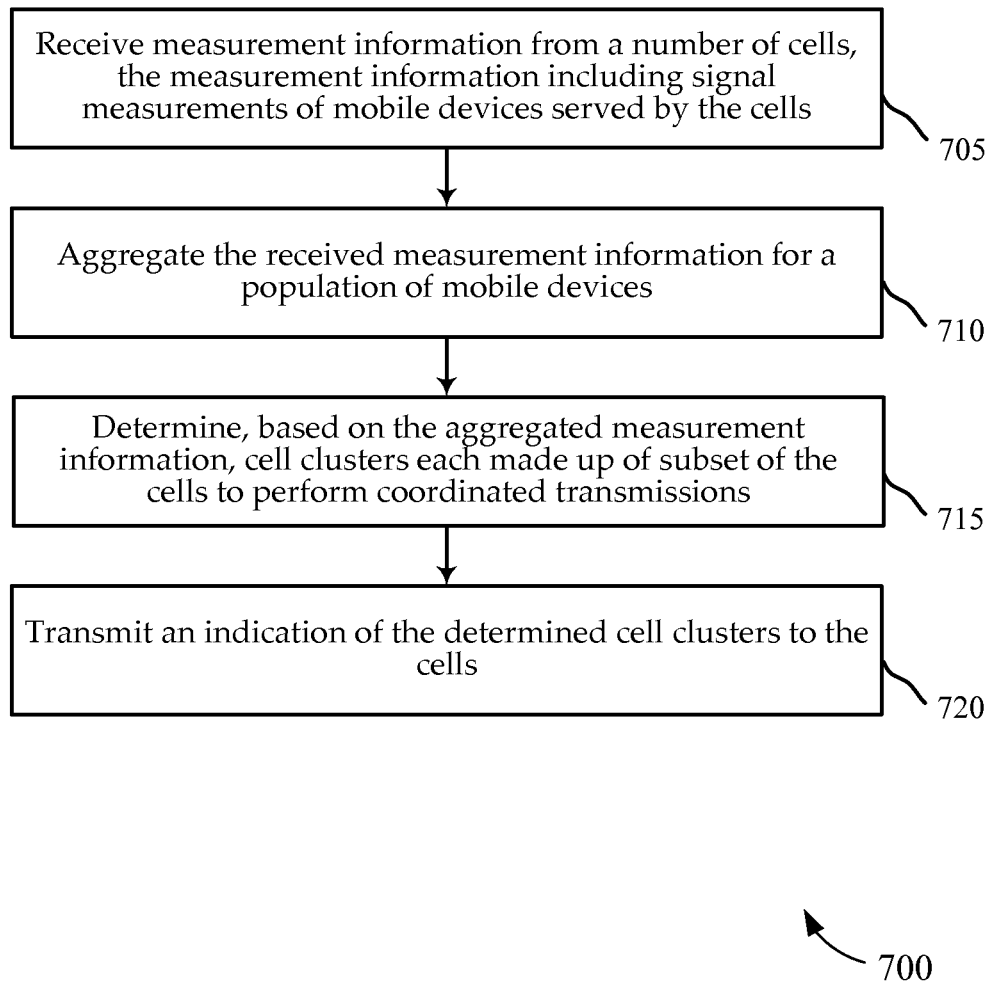
FIG. 7 is a flowchart of a system for adaptive clustering.

FIG. 7 is a flow chart of a system 700 to adaptive clustering. The system may be performed, in whole or in part, by the control unit of FIG. 1 or 4A or, more specifically, by the adaptive clustering module 415 of FIG. 4A or 4B.

At block 705, measurement information from a number of cells is received, the measurement information including signal measurements of mobile devices served by the cells. At block 710, the received measurement information is aggregated for a population of mobile devices. At block 715, based on the aggregated measurement information, cell clusters are determined, each made up of a subset of the cells to perform coordinated transmissions. At block 720, an indication of the determined cell clusters is transmitted to the cells.

Figure 8:
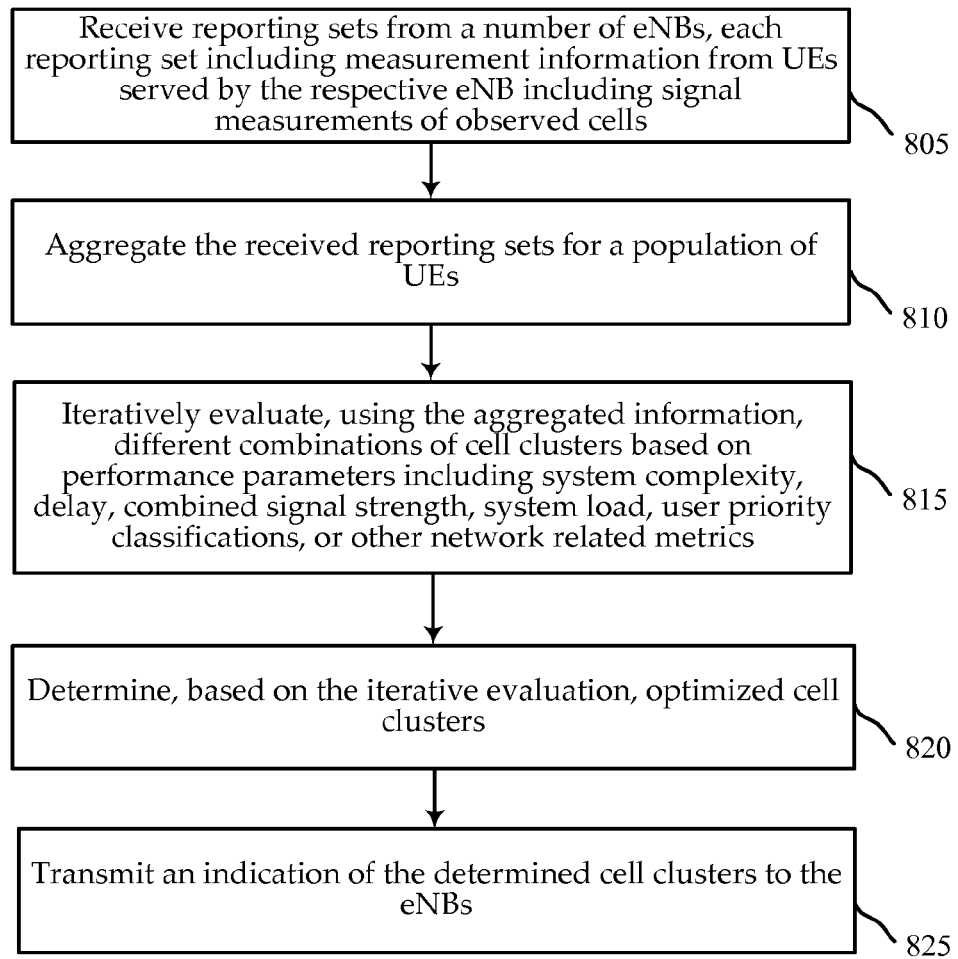
FIG. 8 is a flowchart of an alternative system for adaptive clustering.

FIG. 8 is a flow chart of an alternative system 800 of adaptive clustering. The system may be performed, in whole or in part, by the control unit of FIG. 1 or 4A or, more specifically, by the adaptive clustering module 415 of FIG. 4A or 4B.

At block 805, reporting sets from a number of eNBs are received, each reporting set made up of measurement information from UEs served by the respective eNB including signal measurements of observed cells. At block 810, the received reporting sets are aggregated for a population of UEs. At block 815, using the aggregated information, different combinations of cell clusters are iteratively evaluated based on performance parameters including system complexity, delay, combined signal strength, system load, user priority classifications, or other network related metrics. At block 820, based on the iterative evaluation, optimized cell clusters are determined. At block 825, an indication of the determined cell clusters are transmitted to the eNBs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

It is understood that the specific order or hierarchy of steps in the processes disclosed is merely an example. Based upon design preferences, it is understood that the specific order or hierarchy of steps in the processes may be rearranged while remaining within the scope of the present disclosure. The accompanying system claims present elements of the various steps in an order, but are not intended to be limited to the disclosed order.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks. The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Throughout this disclosure the term "example" or "exemplary" indicates an example or instance and does not imply or require any preference for the noted example. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for adaptive cell clustering, the method comprising:
  receiving measurement information from a plurality of cells, the measurement information comprising signal measurements of mobile devices served by the plurality of cells;
  aggregating the received measurement information for a population of the mobile devices;
  determining, based on the aggregated measurement information, cell clusters each comprising a subset of the plurality of cells to perform coordinated transmissions; and
  transmitting an indication of the determined cell clusters to the plurality of cells.

2. The method of claim 1, wherein the determining the cell clusters comprises:
  changing a first set of cell clusters to a second, different set of cell clusters for the plurality of cells in response to the aggregated measurement information.

3. The method of claim 1, further comprising:
  adapting the cell clusters when one or more performance parameters change in excess of a threshold.

4. The method of claim 1, wherein the determining the cell clusters comprises:
  clustering the plurality of cells to optimize one or more performance parameters.

5. The method of claim 4, wherein the one or more performance parameters comprise system complexity, delay, combined signal strength, system load, user priority classifications, or other network related metrics.

6. The method of claim 1, wherein the determining comprises:
  determining a backhaul delay associated with a candidate cluster; and
  rejecting the candidate cluster when the backhaul delay exceeds a predetermined threshold.

7. The method of claim 1, further comprising:
  iteratively evaluating different combinations of cell clusters.

8. The method of claim 1, wherein the receiving measurement information comprises:
  receiving sorted measurement information from an enhanced Node B (eNB) for mobile devices being served by the eNB.

9. The method of claim 1, wherein the receiving measurement information comprises:
  receiving a table from each cell of the plurality of cells comprising signal strength statistics for mobile devices being served by each respective cell.

10. The method of claim 1, wherein determining the cell clusters comprises:
  identifying a cell cluster based on a rate of recurrence that a cell combination is detected by the mobile devices.

11. The method of claim 1, wherein the receiving comprises receiving information from at least one cell in the plurality of cells based on a change in signal strength of the at least one cell in excess of a threshold.

12. The method of claim 1, wherein the received measurement information comprises an indication of long-term channel conditions for the population of mobile devices.

13. The method of claim 1, further comprising:
  determining a periodicity at a multiple of a scheduling interval for downlink transmissions with which measurement information is collected by or received from the population of mobile devices.

14. The method of claim 1, wherein:
  each cell of the plurality of cells belongs to only one cluster at a time; and
  coverage of the cells of each cluster are geographically adjacent to each other.

15. The method of claim 1, wherein at least a subset of the cells of the plurality of cells belongs to a plurality of clusters at a time.

16. The method of claim 1, further comprising:
  determining a set of neighbor relations corresponding to the plurality of cells, wherein the determined cell clusters comprise cells having adjacent coverage areas.

17. The method of claim 1, wherein the measurement information is received via a backhaul connection.

18. A device for adaptive cell clustering, the device comprising:
  a receiver configured to receive measurement information from a plurality of cells, the measurement information comprising signal measurements of mobile devices served by the plurality of cells;
  an aggregator module, communicatively coupled with the receiver, and configured to aggregate the received measurement information for a population of the mobile devices;
  an adaptive clustering module, communicatively coupled with the aggregator module, and configured to determine, based on the aggregated measurement information, cell clusters each comprising a subset of the plurality of cells to perform coordinated transmissions; and
  a transmitter, communicatively coupled with the adaptive clustering module, and configured to transmit an indication of the determined cell clusters to the plurality of cells.

19. The device of claim 18, wherein the adaptive clustering module is further configured to:
  determine the cell clusters to optimize one or more performance parameters comprising system complexity, delay, combined signal strength, system load, user priority classifications, or other network related metrics; and
  change a first set of cell clusters to a second, different set of cell clusters for the plurality of cells according to the determination.

20. The device of claim 18, wherein the device comprises a processor.

21. A system for adaptive cell clustering, the system comprising:
  means for receiving measurement information from a plurality of cells, the measurement information comprising signal measurements of mobile devices served by the plurality of cells;
  means for aggregating the received measurement information for a population of the mobile devices;
  means for determining, based on the aggregated measurement information, cell clusters each comprising a subset of the plurality of cells to perform coordinated transmissions; and
  means for transmitting an indication of the determined cell clusters to the plurality of cells.

22. The system of claim 21, wherein the means for determining the cell clusters comprises:
  means for changing a first set of cell clusters to a second, different set of cell clusters for the plurality of cells in response to the aggregated measurement information.

23. The system of claim 21, further comprising:
means for adapting the cell clusters when one or more performance parameters change in excess of a threshold.

24. The system of claim 21, wherein the means for determining the cell clusters comprises:
means for clustering the plurality of cells to optimize one or more performance parameters.

25. The system of claim 24, wherein the one or more performance parameters comprise system complexity, delay, and combined signal strength.

26. The system of claim 21, wherein the means for determining comprises:
means for determining a backhaul delay associated with a candidate cluster; and
means for rejecting the candidate cluster when the backhaul delay exceeds a predetermined threshold.

27. The system of claim 21, further comprising:
means for iteratively evaluating different combinations of cell clusters.

28. The system of claim 21, wherein the means for receiving measurement information comprises:
means for receiving sorted measurement information from an enhanced Node B(eNB) for user equipment being served by the eNB.

29. The system of claim 21, wherein the means for receiving measurement information comprises:
means for receiving a table from each cell of the plurality of cells comprising signal strength statistics for mobile devices being served by each respective cell.

30. The system of claim 21, wherein the means for receiving comprises:
means for receiving information from at least one cell in the plurality of cells based on a change in signal strength of the at least one cell in excess of a threshold.

31. The system of claim 21, wherein the received measurement information comprises an indication of long-term channel conditions for the population of mobile devices.

32. The system of claim 21, further comprising:
means for determining a periodicity at a multiple of a scheduling interval for downlink transmissions with which measurement information is collected by or received from the population of mobile devices.

33. The system of claim 21, wherein:
each cell of the plurality of cells belongs to only one cluster at a time.

34. The system of claim 21, further comprising:
means for determining a set of neighbor relations corresponding to the plurality of cells, wherein the determined cell clusters comprise cells having adjacent coverage areas.

35. A computer program product comprising:
a non-transitory computer-readable medium comprising:
code for receiving measurement information from a plurality of cells, the measurement information comprising signal measurements of mobile devices served by the plurality of cells;
code for aggregating the received measurement information for a population of the mobile devices;
code for determining, based on the aggregated measurement information, cell clusters each comprising a subset of the plurality of cells to perform coordinated transmissions; and
code for transmitting an indication of the determined cell clusters to the plurality of cells.

36. A method comprising:
receiving at a serving cell measurement information comprising sets of cells observed by mobile devices associated with the serving cell;
forming a reporting set for each cell in the sets of cells having a signal strength that exceeds a predetermined threshold value;
transmitting the reporting sets to a control unit; and
receiving an indication of a cell cluster determined by the control unit based on the reporting sets for a plurality of cells, including the serving cell.

37. The method of claim 36, wherein the forming a reporting set comprises:
discarding measurements for which a mobile device reported signal strength below a threshold.

38. The method of claim 36, wherein the receiving the indication of the cell cluster comprises:
receiving a change from a first cell cluster to a second, different cell cluster in response to the transmitting the sorted lists.

39. The method of claim 36, wherein the receiving the indication of the cell cluster comprises:
receiving an adaptation to a cell cluster when one or more performance parameters change in excess of a threshold.

40. The method of claim 36, wherein the forming the reporting sets further comprises:
determining neighbor relations information corresponding to cells identified in the measurement information.

41. The method of claim 36, wherein the transmitting the reporting sets comprises:
transmitting the reporting sets when it is determined that signal strength of at least one cell changes in excess of a threshold.

42. The method of claim 36, wherein transmitting the reporting sets comprises:
transmitting the reporting sets at a predetermined reporting interval.

43. The method of claim 42, wherein the predetermined reporting interval is based a size of a cell cluster to which the serving cell belongs.

44. The method of claim 36, further comprising:
identifying a combination of cells detected by each of a subset of the mobile devices;
transmitting the combination of cells to a control unit; and
receiving an indication of a cell cluster determined by the control unit based on the combination of cells.

45. A system comprising:
means for receiving at a serving cell measurement information comprising sets of cells observed by mobile devices associated with the serving cell;
means for forming a reporting set for each cell in the sets of cells having a signal strength that exceeds a predetermined threshold value;
means for transmitting the reporting sets to a control unit; and
means for receiving an indication of a cell cluster determined by the control unit based on the reporting sets for a plurality of cells, including the serving cell.

46. The system of claim 45, wherein the means for forming a reporting set comprises:
means for discarding measurements for which a mobile device reported signal strength below a threshold.

47. The system of claim 45, wherein the means for receiving the indication of the cell cluster comprises:
means for receiving a change from a first cell cluster to a second, different cell cluster in response to the transmitting the sorted lists.

48. The system of claim 45, wherein the means for receiving the indication of the cell cluster comprises:
    means for receiving an adaptation to a cell cluster when one or more performance parameters change in excess of a threshold.

49. The system of claim 45, wherein the means for forming the reporting sets further comprises:
    means for determining neighbor relations information corresponding to cells identified in the measurement information.

50. The system of claim 45, wherein the means for transmitting the reporting sets comprises:
    means for transmitting the reporting sets when it is determined that signal strength of at least one cell changes in excess of a threshold.

51. The system of claim 45, wherein the means for transmitting the reporting sets comprises:
    means for transmitting the reporting sets at a predetermined reporting interval based a size of a cell cluster to which the serving cell belongs.

* * * * *